United States Patent
MacDuff

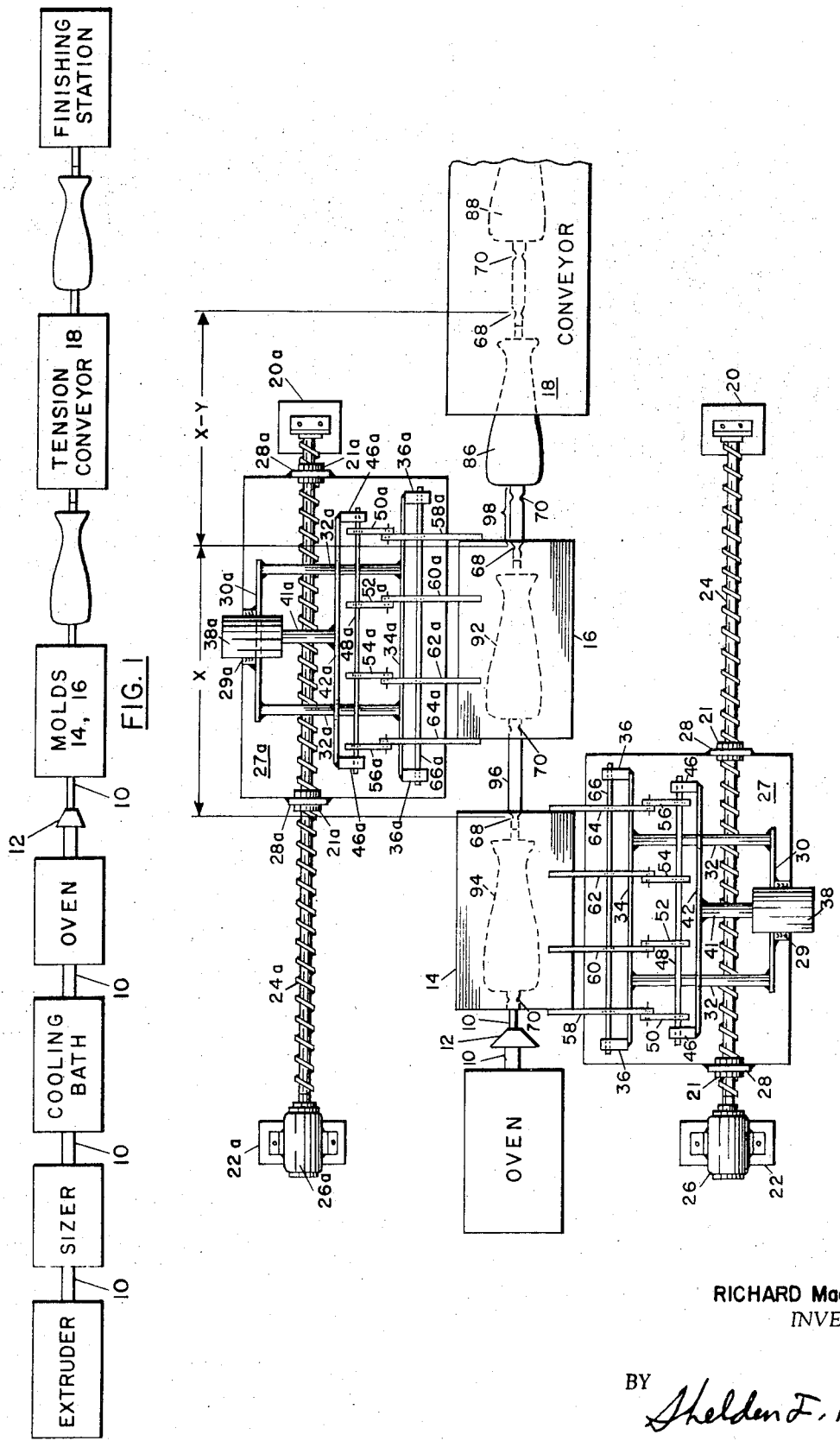

[15] 3,699,199
[45] Oct. 17, 1972

[54] CONTINUOUS BLOW MOLDING PROCESS WITH REDUCTION OF LENGTH COMPENSATION

[72] Inventor: Richard MacDuff, Newark, Del.

[73] Assignee: Hercules Incorporated, Wilmington, Del.

[22] Filed: Dec. 30, 1970

[21] Appl. No.: 102,694

[52] U.S. Cl. .....................264/99, 264/334, 425/326
[51] Int. Cl. ............................B29c 17/07, B29c 7/00
[58] Field of Search.............264/94, 98, 99, 96, 334; 425/326, 387

[56] References Cited

UNITED STATES PATENTS 3,211,815   10/1965   Cordiale et al. ........264/334 X

Primary Examiner—Robert F. White
Assistant Examiner—J. H. Silbaugh
Attorney—Sheldon F. Raizes

[57] ABSTRACT

In a continuous blow molding operation, mold release of the newly formed container is facilitated by providing a conveyor adjacent to the point where the mold opens. The newly formed container is connected at one end by waste material to a previously formed container that is in the conveyor and is connected at the other end to material in a closed mold behind the mold that is opening. The conveyor haul off speed and the speed of the molds are at a relative rate which maintains a certain tension in the waste material between the previously formed container and the newly formed container and there is also tension in the material between the two molds. This tension facilitates mold release of the newly formed container upon opening of the mold. The speed of the molds is greater than the haul off speed of the conveyor by a rate which is substantially equal to the rate of reduction of length in the material between the previously formed container and the closed mold to prevent any deformity in the containers due to an excess of tension.

7 Claims, 5 Drawing Figures

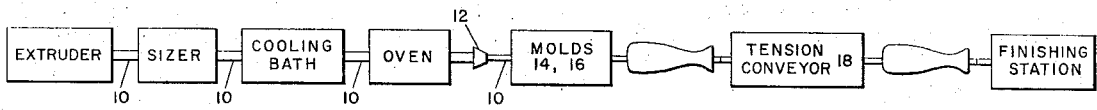

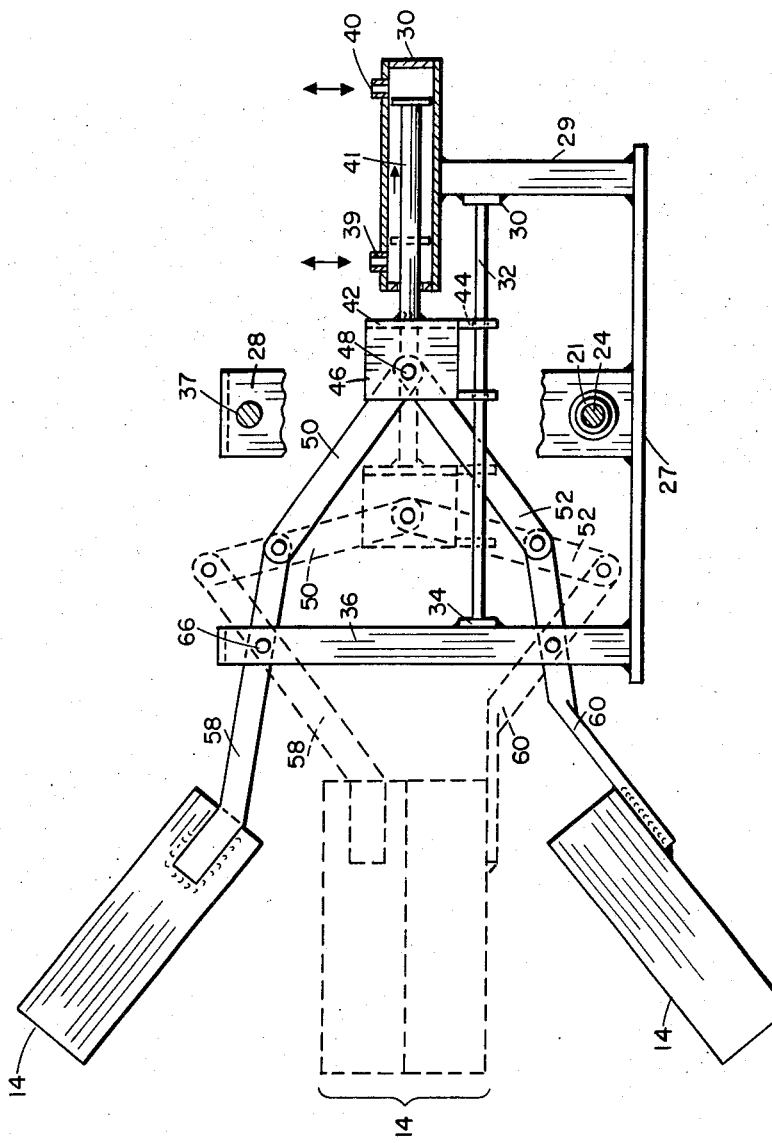

PATENTED OCT 17 1972

RICHARD MacDUFF
INVENTOR

BY Sheldon F. Raizes
ATTORNEY

CONTINUOUS BLOW MOLDING PROCESS WITH REDUCTION OF LENGTH COMPENSATION

It is an object of this invention to facilitate mold release of oriented containers made by a continuous blow molding process and comprise solid polymers of mono-α-olefins containing up to 6 carbon atoms which have high degrees of crystallinity, for example high density ethylene polymers and isotactic polypropylene, poly-4-methylpentene-1, polybutene and the like.

Other objects of the invention will become apparent from the following description with reference to the drawings wherein:

FIG. 1 is a flow diagram of the process;

FIG. 2 is a plan view of the apparatus for effecting the process of this invention;

FIG. 3 is an end side view of one of the molds and the actuating mechanism therefor;

Figure 4:
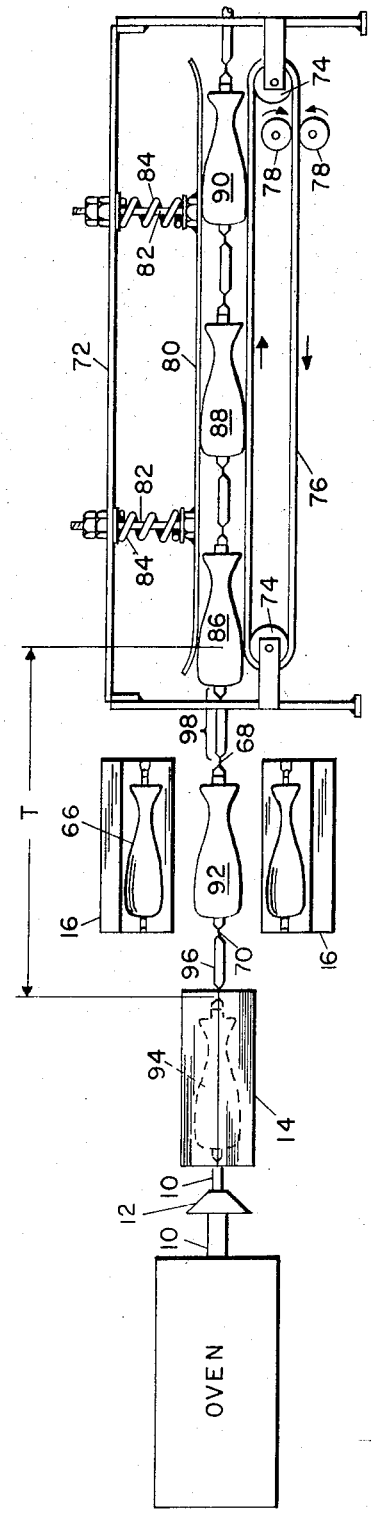
FIG. 4 is a simplified side view of the embodiment of FIG. 2 showing the relative positions of the molds when one of the molds is in a bottle release position.

Referring to the flow diagram of FIG. 1, an extruder is utilized to extrude a tube 10 preferably made of polypropylene. The tube passes through a sizer and then a cooling bath where the tube is cooled below the crystalline temperature. In the case of polypropylene, the tube is cooled to about 120° C. to hasten crystallization. The tube 10 is drawn from the extruder through the sizer and cooling bath by a driven set of opposed tires (not shown). The tube 10 is reheated in an oven to a few degrees below the crystalline melting point (about 140° c. -167° C.) and after being reheated, passes through a restrictor cone 12 to molds 14 and 16 which alternately grip the tube 10 and move away from the oven to stretch the same through the cone 12 to orient the tube. Each of the molds is communicated with a source of pressure which is utilized to expand the tube inside the mold to form a container. The container proceeds to a conveyor 18 having a chain of bottles. The bottles then pass from the conveyor to a finishing station where the bottles are separated, trimmed, and the necks are bored to final size.

The invention is directed to a process for continuously blow molding crystalline oriented containers where the container is placed in sufficient tension upon opening the mold in which the container is formed to help discharge the container from the mold. The procedure for producing this effect will be described in detail.

Referring to FIGS. 2 and 3, support members 20 and 22 are provided with each support 20 having an internally threaded bushing 21 receiving one end of a rotatable threaded shaft 24 and each support 22 having a reversible motor 26 fixed thereto receiving the other end of the threaded shaft 24. A longitudinally movable mold carriage is provided and comprises a platform 27, a pair of longitudinally spaced plates 28 fixed to the platform 27, plate 29 fixed to the platform 27, a bar 30 secured to the plate 29, and guide bars 32 which are secured to bar 34 which is in turn secured to a pair of longitudinally spaced plates 36. A carriage guide bar 37 extends parallel to and above the threaded shaft 24 and is fixed to the supports 20 and 22. The bar 37 is not shown in FIG. 2 in the interest of maintaining clarity. As shown in FIG. 3, the bar 37 passes through supports 28 to slidably guide the carriage structure. A hydraulic cylinder 38 having ports 39 and 40 is secured to the plate 29 and has a piston rod 41 slidable therein. Attached to the piston rod 41 is a slidable plate 42 secured thereto which has openings 44 through which the bars 32 extend for slidably guiding the plate 42. Flanges 46 are secured on each end of the plate 42 and a shaft 48 is secured to the flanges 46. A plurality of links 50, 52, 54, and 56 are pivotally mounted at one end to the shaft 48 and pivotally secured at the other end to lever arms 58, 60, 62, and 64, respectively. The lever arms are pivotally connected intermediate the ends thereof to a stationary shaft 66 secured to the plates 36. The other end of levers 60 and 62 are secured to the upper half of the mold and the other end of levers 58 and 64 are secured to the lower half of the mold for opening and closing the same.

The mold is closed from the open position illustrated in FIG. 3 by introducing pressure into cylinder 30 through port 40 thereby moving the piston rod 41 forward to slide the plate 42 on guide bars 32 forward as well as the link pivot shaft 48. Forward movement of the pivot shaft 48 pivots the links 50, 52, 54, and 56 in a clockwise direction about their pivotal connections with the respective lever arms which in turn causes the lever arms 58, 60, 62 and 64 to pivot counterclockwise about the shaft 66 to close the mold as shown in phantom in FIG. 3. Introduction of pressure into port 39 of the cylinder 30 causes the piston rod 41 to move in the opposite direction causing the links and levers to move from the phantom position to the mold open position shown in full in FIG. 3. The mold is moved in a longitudinal direction away or towards the oven by actuating the motor 26 to rotate the threaded shaft 24 through the threaded connection thereof with the bushing 21 forcing the whole mold carriage structure to slide along guide shaft 37 either away from or towards the oven depending upon the direction of rotation of its respective shaft. The description for the actuating mechanism for the mold 16 is the same as that for mold 14 with the reference numerals therefor being the same only with an "a" affixed thereto.

The system for introducing air pressure into the molds, opening and closing the molds, and operating the threaded shafts for moving the molds, all in proper sequence, comprises limit switches, air-brake contactors, solenoid valves and timers all of which are well known and do not form any part of this invention.

Referring to the closed molds, the main cavity 66 (FIG. 4) thereof of the mold is in the shape of a bottle. The molds pinch or seal the tubing 10 at a front pinch line 68 and at a rear pinch line 70.

The conveyor 18 comprises a support frame 72 on which rollers 74 are mounted. A conveyor belt 76 is wrapped around the rollers 74 and driven by drive rolls 78 which engage the same. A brake plate 80 is mounted to the frame by pins 82 which are slidably received therein. A coil spring 84 surrounds each pin and is compressed between the top of the frame and the brake plate 80 urging the brake plat into engagement with a plurality of bottles 86, 88, 90. The force of the springs 84 on the bottles is substantial enough to prevent any rearward movement of the bottles due to forces tending to pull the bottles in that direction.

Figure 5:
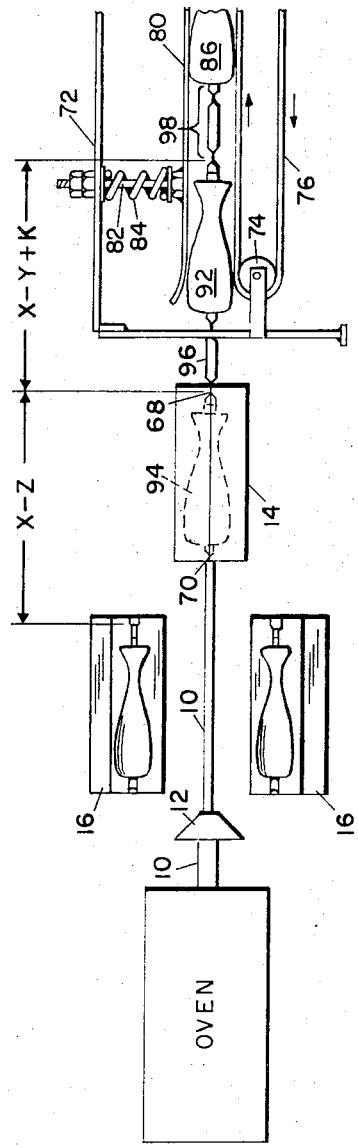
FIG. 5 is a view similar to the view of FIG. 4 showing the relative positions of the molds when one of the molds is ready to close.

In operation, FIG. 2 illustrates the molds both in closed position with a bottle 92 being formed in mold 16 which is ready to be opened. The mold 14 has just closed about a length of tubing 10 and a bottle 94 has been formed therein by communication of air pressure into the tube through a blow pin (not shown) located in the mold and penetrating the tubing. The cylinder 38a is actuated to open mold 16 and the motor 26 is rotating shaft 24 in a counterclockwise direction to move mold 14 forward away from the oven at a faster rate than the rate the tubing 10 is emerging from the oven. The mold 14 grips the tube 10 to pull the same through a restrictor cone 12 and stretch or orient a length of tubing to about two and one-half to four times its original length in the longitudinal direction. As the mold 14 moves forward, motor 26a is actuated to rotate the shaft 24a in a clockwise direction to move the mold 16 back towards the oven where it takes a position adjacent a length of oriented tubing as shown in FIG. 5. At this position the motor 26a is stopped, reversed to rotate the shaft 24a counterclockwise to move the mold 16 away from the oven and then cylinder 38a actuated to close the mold on the tubing to form another bottle. The cylinder 38 is then actuated to open the mold 14 and then motor 26 is reversed to rotate the shaft 24 in a clockwise direction to return the mold 14 towards the oven to again repeat the same cycle.

It should be realized that just prior to opening mold 16, the length "x" of oriented material from the front seal line 68 of mold 14 to the front seal line 68 of mold 16 is in a condition wherein a substantial reduction in length will occur upon opening of the mold 16. This condition is due primarily to elastic recovery and to a minimal degree temperature shrinkage. More reduction in length will occur in the waste material 96 between the molds 14 and 16 than in the bottles. A portion of the bottle 86 and the waste material 98 interconnecting the bottle 92 with the bottle 86 is kept in slight tension or taut by the continuously rotating belt 76 of the conveyor 18 in order that there be an initial tension in the waste material 98. This initial tension is minimal and usually less than a one pound force or pull. This tension helps to discharge the bottle 92 from the mold 16. Because there is this initial tension in waste material 98, the reduction in length must be compensated for or too much tension will build up in the free material resulting in the bottom of either or both bottles 86, 92 failing.

The distance "x—y" between the front seal line 68 of bottle 86 and the front seal line 68 of bottle 92 is the length of the material after reduction in length. In order that the reduction in length not create more than slight tension within the material "T" (FIG. 4), the mold 14 must travel a distance of "x" while the conveyor moves bottle 92 a distance "x—y." In other words, the speed of the mold is faster than the haul off speed of the conveyor by substantially the rate of "snap-back." FIG. 5 shows that as the mold 16 is about ready close on oriented tube 10, the mold 14 has traveled "x—z" distance while the distance between the front seal line 68 on the bottle 94 and the front seal line 68 on the bottle 92 has shrunk to "x—y+k," "k" being the amount of shrinkage left and "z" the distance forward mold 14 still has to traverse.

The rate of reduction in length will depend upon a various number of factors such as the amount of stretch imparted to the tubing, the temperature of the tubing upon stretching, the temperature of the molds, the size of the blown container, the amount of waste material, the polymer used, etc. For instance, if a polypropylene (Pro-fax 6801) tubing were stretched to approximately three times its original length at a temperature of about 165° C. and the mold temperature is at about 13° C., the rate of reduction in length would be about 9 percent (y)/(x). The haul off speed of the conveyor would be set at about 10 ft./min. and the mold speed at about 11 ft./min. resulting in just enough tension between the bottle 92 and the bottle 94 to help free the bottle 94 from the mold 14 when it opens, but not enough tension to deform any portion of material "T."

While a particular moving mold system has been illustrated, it is obvious that this invention can apply to other mold systems such as that described in U.S. Pat. No. 3,288,317 (FIG. 3).

What I claim and desire to protect by Letters Patent is:

1. A process for blow molding oriented containers comprising: providing an indefinite length of tubing comprising a solid polymer of crystalline mono-α-olefin containing up to six carbon atoms, heating means, molds forward of said heating means, and a conveyor forward of said molds; continuously passing the tubing through said heating means to heat the tubing just below the crystalline melting point of the tubing; clamping one mold about an oriented portion of the tubing after it emerges from the heating means; moving said one mold forward away from said heating means; stretching and orienting that portion of the tubing between said one mold and said heating means; clamping another mold about the newly stretched portion of the tubing, moving said another mold forward away from said heating means; stretching and orienting that portion of the tubing between said another mold and heating means; said molds each sealing the tubing at a front seal line and a rear seal line when closed; expanding the tubing to conform to the shape of said one mold prior to clamping said another mold; expanding the tubing to conform to the shape of said another mold after said another mold is closed; opening said one mold to dispose of the container formed therein after said another mold is clamped closed; said container being connected at the forward end through waste material to a container on the conveyor and at the rear end to the container in said another mold; the improvement comprising maintaining tension in the waste material located between said container on the conveyor and the forward seal line on said one mold and in the waste material between said molds when both are closed whereby upon opening of said one mold the tension on the material will help dislodge the newly formed container from said one mold, and moving each mold toward said conveyor at a lineal speed which is faster than the lineal speed the conveyor is moving said container thereon by a rate substantially equal to the rate of reduction in length of the material between the forward seal lines of each of said molds to maintain tension in the material substantial enough to facilitate mold release but small enough to prevent deformity of any of the containers included in the material in tension.

2. The process as recited in claim 1 wherein said crystalline mono-α-olefin is polypropylene.

3. The process as recited in claim 1 wherein said crystalline mono-α-olefin is polypropylene and said containers are bottles.

4. The process as recited in claim 1 wherein only two molds are used whereby said one mold after opening, moves on a return stroke to clamp the oriented portion of the tubing between said heating means and said another mold.

5. A process for blow molding oriented containers comprising: providing an indefinite length of tubing comprising a solid polymer of crystalline mono-α-olefin containing up to six carbon atoms, heating means, molds forward of said heating means, and a conveyor forward of said molds; said molds including a pair of molds one behind another; each of said molds having an oriented, expanded container therein; each container having a front seal line and a rear seal line; the container in one mold being connected at one end through waste material to a container on said conveyor and at the other end through waste material to the container in the other mold; the improvement comprising maintaining tension in the waste material located between said container on the conveyor and the forward seal line on said one mold and in the waste material between said pair of molds when both are closed whereby upon opening of said one mold the tension on the material will help dislodge the newly formed container from said one mold, and moving said molds toward said conveyor at a lineal speed which is faster than the lineal speed the conveyor is moving said container thereon by a rate substantially equal to the rate of reduction in length of the material between the forward seal lines of each of said molds to maintain tension in the material substantial enough to facilitate mold release but small enough to prevent deformity of any of the containers included in the material in tension.

6. The process as recited in claim 5 wherein said crystalline mono-α-olefin is polypropylene.

7. The process as recited in claim 5 wherein said crystalline mono-α-olefin is polypropylene and said containers are bottles.

* * * * *